(12) United States Patent
Small

(10) Patent No.: US 6,940,541 B1
(45) Date of Patent: Sep. 6, 2005

(54) PRINTER PARAMETER COMPENSATION BY A HOST CAMERA

(75) Inventor: Jeffrey Alan Small, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 19 days.

(21) Appl. No.: 08/833,106

(22) Filed: Apr. 4, 1997

(51) Int. Cl.[7] ............................................. H04N 5/225
(52) U.S. Cl. ................................................... 348/207.2
(58) Field of Search ................................ 358/500, 501, 358/502, 503, 504, 515, 523, 448, 449, 451, 358/445, 450; 348/581, 582, 583, 207.2; 399/130, 131, 144, 151

(56) References Cited

U.S. PATENT DOCUMENTS

| | | | |
|---|---|---|---|
| 4,161,749 A | | 7/1979 | Erlichman |
| 4,694,749 A | * | 9/1987 | Takeuchi et al. ............ 101/492 |
| 4,827,347 A | | 5/1989 | Bell |
| 4,937,676 A | * | 6/1990 | Finelli et al. ................ 348/375 |
| 4,942,477 A | | 7/1990 | Nakamura |
| 4,952,951 A | * | 8/1990 | Kumasaka et al. ......... 347/130 |
| 5,040,068 A | * | 8/1991 | Parulski et al. ............. 348/376 |
| 5,138,459 A | | 8/1992 | Roberts et al. |
| 5,237,401 A | * | 8/1993 | Koike et al. ................ 358/500 |
| RE34,654 E | | 7/1994 | Yamawaki |
| 5,384,646 A | * | 1/1995 | Godshalk et al. ........... 358/448 |
| 5,461,459 A | * | 10/1995 | Muramatsu et al. ........ 358/448 |
| 5,499,113 A | * | 3/1996 | Tsuboi et al. ............... 358/448 |
| 5,563,655 A | | 10/1996 | Lathrop |
| 5,717,839 A | * | 2/1998 | Ichikawa ..................... 358/523 |
| 5,721,620 A | * | 2/1998 | Arai et al. ................... 358/296 |
| 5,754,184 A | * | 5/1998 | Ring et al. .................. 345/431 |
| 5,781,315 A | * | 7/1998 | Yamaguchi .................. 358/520 |
| 5,933,580 A | * | 8/1999 | Uda et al. .................... 358/408 |
| 6,108,008 A | * | 8/2000 | Ohta ............................ 345/431 |

FOREIGN PATENT DOCUMENTS

| | | |
|---|---|---|
| EP | 0 405 470 A2 | 1/1991 |
| EP | 0 675 648 A2 | 10/1995 |

* cited by examiner

*Primary Examiner*—Wendy R. Garber
*Assistant Examiner*—Jacqueline Wilson
(74) *Attorney, Agent, or Firm*—Milton S. Sales; Mark G. Bocchetti

(57) ABSTRACT

A system wherein already-existing computing and memory resources in an electronic camera are used to process an image for printing. Rather than duplicating, in printers, computing and memory resources that are already in digital cameras, significant computing and memory resources need exist only in the camera. A digital camera can support many different printers, each with its own set of parameters such as for example print size, pixel size, colorimetry, sensitometry, and artifacts compensation. Printer parameters are uploaded from the printer to the camera to provide a basis for image processing specific to the associated printer; whereby compensation may be done for variations in the printer characteristics which may occur as a result of printer manufacturing variations, and further so that compensation may be done for different media types which may be installed in the printer.

18 Claims, 2 Drawing Sheets

PRINTER PARAMETER COMPENSATION BY A HOST CAMERA

FIELD OF THE INVENTION

The present invention relates to digital cameras and associated printers for producing hardcopy images captured by such cameras.

BACKGROUND OF THE INVENTION

Typically, images captured by digital cameras must be processed before they are printed. This processing is carried out in the printer. Significant computing and memory resources are required to process an image for printing. Accordingly, the printer must be provided with expensive computing and memory resources. One solution known in the prior art is to provide access to a stand-alone computer that is connectable to both the camera and the printer, either directly or by portable memory. This solution is inappropriate when the printer is to be used in remote locations distanced from the computer.

DISCLOSURE OF THE INVENTION

According to a feature of the present invention, I have come to appreciate that computing and memory resources, which already exist in electronic cameras in order for the camera to capture, process, compress, and store images, can be used to provide the computing and memory resources that are required to process an image for printing.

It is an object of the present invention to provide a system wherein already-existing computing and memory resources in an electronic camera are used to process an image for printing. This is possible because the existing computing and memory resources are otherwise generally idle during the printing stage. Accordingly, it is a feature of the present invention that, rather than duplicating, in printers, computing and memory resources that are already in digital cameras, the present invention provides for camera and printer systems wherein significant computing and memory resources need exist only in the camera. Because such resources are already required by the camera in order to perform the camera functions, the cost of the camera is not increased. Because the resources are no longer required in the printer, the overall system cost is greatly reduced.

It is another object of the present invention to provide a digital camera that can support many different printers, each with its own set of parameters such as for example print size, pixel size, colorimetry, sensitometry, and artifacts compensation. Accordingly, it is a feature of the present invention to provide for uploading printer parameters from the printer to the camera to provide a basis for image processing specific to the associated printer; whereby compensation may be done for variations in the printer characteristics which may occur as a result of printer manufacturing variations, and further so that compensation may be done for different media types which may be installed in the printer.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
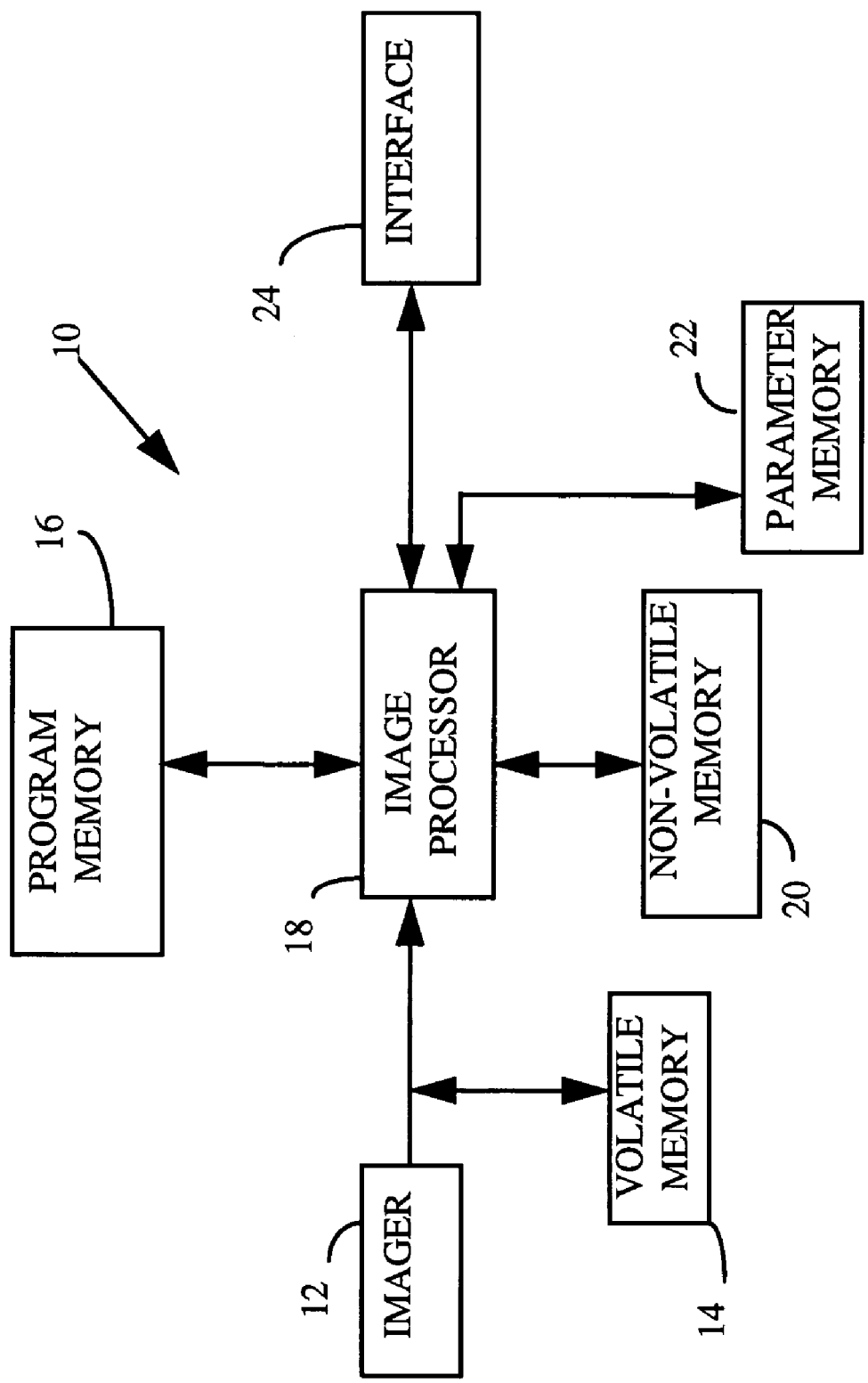
FIG. 1 is a schematic block diagram of a digital camera according to the present invention.

Referring to FIG. 1, a digital camera 10 provides significant image processing and memory resources to capture, process, compress, and store images. An imager 12 includes an array of image sensors. Conventionally, a complete image frame is available in digital form from imager 12, only for a short time interval. Thus, the captured image is temporarily stored in raw form in a volatile memory 14. Various image processing algorithms are stored in a program memory 16, and are executed by an image processor 18 in order to process the image data stored in volatile memory 14. For example, the image processing algorithms may include all or some of the processes of image sensor tone scale compensation, color filter array interpolation, color space transformation, re-sizing, spatial filtering, and compression. The resulting processed image data is then typically stored in a nonvolatile memory 20.

This stored image must be further processed prior to printing. Such further processing may include some or all of the steps of decompression, color space transformation into color planes that coincide with the process colors of the particular printer, re-sizing, rotation, and compensation for the printing process. In prior art systems, this further processing has been effected by computing and memory resources in the printer or in a stand-alone computer. According to the present invention, this further processing is performed using the resources which are already in camera 10. It is advantageous to perform all of the processing using the resources in camera 10 in order to avoid the additional expense of including similar resources in the printer. To effect such image processing in camera 10, the camera is provided with a parameter memory 22 and a printer interface 24, both to be further described hereinafter.

Figure 2:
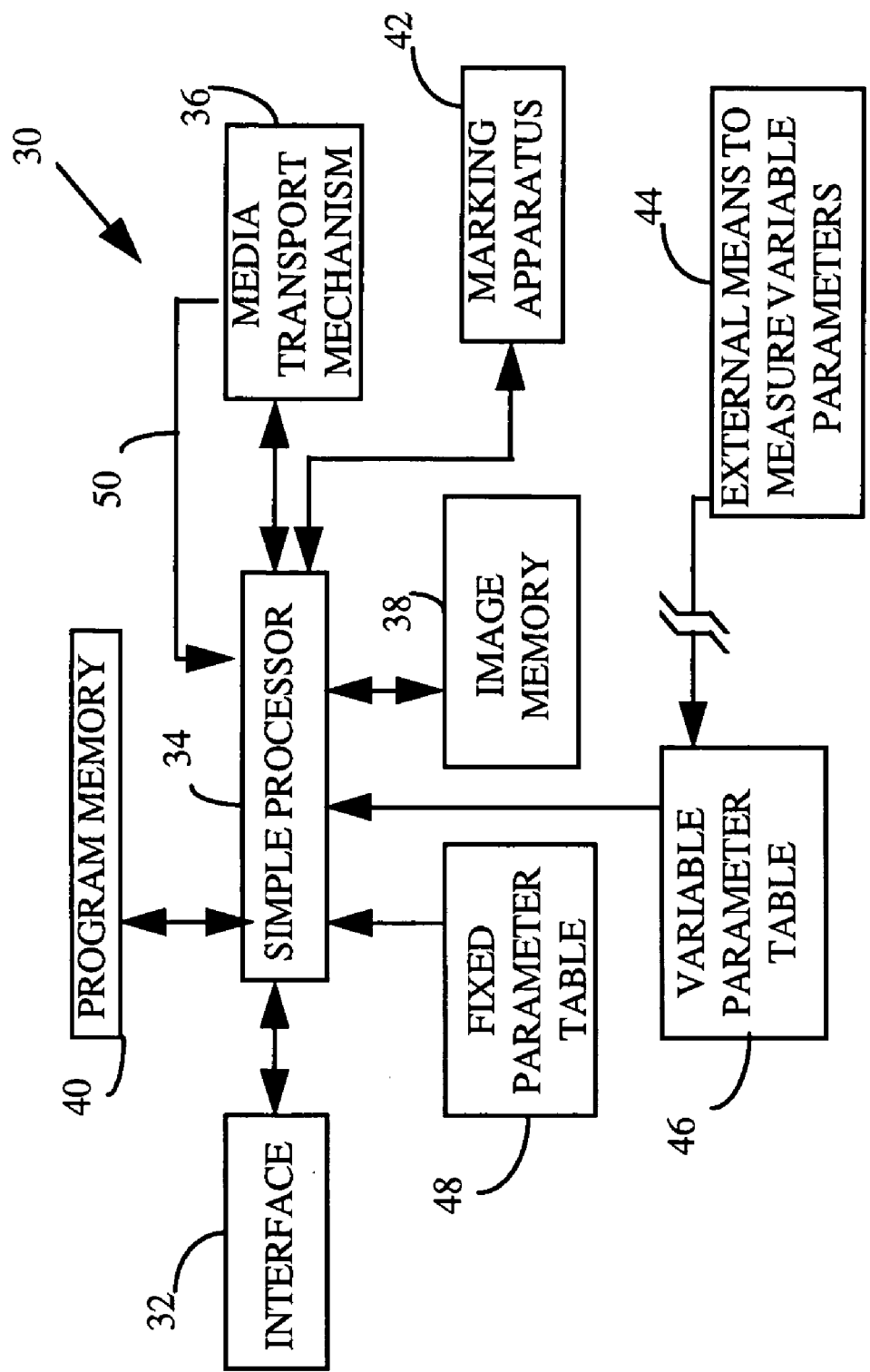
FIG. 2 is a schematic block diagram of a digital printer according to the present invention.

Referring to FIG. 2, a printer 30 includes a camera interface 32, an inexpensive simple processor 34, a media transport mechanism 36, an image memory 38, a program memory 40, and a marking apparatus 42. A processed image, received from camera 10 of FIG. 1 via interface 32, may be stored by printer 30 in image memory 38 for subsequent printing by marking means 42 under the control of simple processor 34 and a program stored in program memory 40, or the processed image may be printed immediately. Simple processor 34 need not be capable of executing printer compensation algorithms.

Parameters which may vary as a result of manufacturing variations in the printer may be measured by an external means 44 at the time of manufacture. Said parameters may then be stored in a variable parameter table 46 which is part of the printer. Camera 10 may query printer 30 to establish whether the printer will perform compensation for the variable parameters, or whether the camera should request and accept the variable parameters from the printer, and subsequently perform compensation for said variable parameters. The printer provides both fixed parameters from a fixed parameter table 48 and variable parameters from its variable parameter table 46 to the camera by means of camera and printer interfaces 24 and 32, respectively. The camera stores these parameters in local parameter memory 22.

When an image in either volatile memory 14 or nonvolatile memory 20 is selected for printing, image processor 18 processes said selected image using the fixed and variable parameters which are stored in parameter memory 22, and transmits the processed image to the printer by means of the interfaces 24 and 32. Processing may include all or part of the operations of image sensor tone scale compensation, color filter array interpolation, decompression, color space transformation, re-sizing, rotation, cropping, spatial filtering, and compensation for the printing process, but is not limited to these specific operations.

In addition, parameters which can vary during printing may also be transmitted by the printer to the camera during the printing process and used by image processor 18 to further compensate the image for printing process variations during the printing operation. The parameters may include temperature, ink viscosity, measured density, and any other parameters which are known to vary with the specific printing process employed by the printer.

Further, parameters characteristic of particular media material at media transport mechanism 36 may be determined by simple processor 34 over an interface 50 and transmitted to the camera. The media parameters may include parameters which vary with media type and parameters which vary between different batches of media due to manufacturing variations. Thus, compensation for the media parameters may be done by image processor 18 in the camera.

The invention has been described in detail with particular reference to preferred embodiments thereof, but it will be understood that variations and modifications can be effected within the spirit and scope of the invention.

What is claimed is:

1. A digital imaging system comprising:
    a digital camera including an image sensor for capturing image frames, the digital camera also including:
    a volatile memory for temporarily storing the captured image frames as raw image data;
    a program memory for storing image processing algorithms;
    an image processor for executing a first plurality of stored image processing algorithms in order to process the raw image data to produce processed image data, the first plurality of stored image processing algorithms including color filter array interpolation, tone scale compensation, color space transformation, and compression;
    a nonvolatile memory for storing the first processed image data;
    a printer interface for directly connecting the digital camera to the digital printer to enable the digital camera to receive fixed printer parameters and variable printer parameters from the digital printer and to provide second processed image data to the digital printer; and
    a parameter memory for storing the fixed printer parameters and the variable printer parameters received from the digital printer; and
    the printer comprising:
    a media transport mechanism and a marking apparatus for producing a print using process colors;
    a memory for storing the fixed printer parameters and the variable printer parameters;
    a processor for controlling the media transport mechanism and the marking apparatus, the processor being coupled to the memory to read the stored fixed printer parameters and variable printer parameters; and
    a camera interface coupled to the processor, for providing the fixed printer parameters and the variable printer parameters to the digital camera and for receiving the second processed image data from the digital camera; and
    wherein the image processor in the digital camera executes a second plurality of stored image processing algorithms in order to produce the second processed image data, the second plurality of stored image processing algorithms including decompression, color space transformation into color planes that co-incide with the process colors of the digital printer, and compensation for the printing process, the compensation being responsive to the fixed printer parameters and variable printer parameters stored in the parameter memory.

2. The digital imaging system as set forth in claim 1 wherein the variable printer parameters compensate for printing process variations determined when the printer is manufactured.

3. The digital imaging system as set forth in claim 2 wherein the variable printer parameters are measured using an external means.

4. The digital imaging system as set forth in claim 1 wherein the camera interface and printer interface are provided using a cable connection.

5. The digital imaging system as set forth in claim 1 wherein the camera interface and printer interface are provided using infrared transmission.

6. A digital imaging system as recited in claim 1 further comprising:
    first printing parameters which can vary during printing transmitted by the printer to the digital camera and wherein the compensation is responsive to the first printing parameters which can vary during printing.

7. A digital imaging system as recited in claim 6 further comprising:
    second printing parameters which vary with particular media type used in the printer and wherein the compensation is responsive to the second printing parameters.

8. A digital imaging system as recited in claim 7 wherein:
    the first printing parameters allow for compensation for printing temperature variations.

9. A digital imaging system as recited in claim 7 wherein:
    the first printing parameters allow for compensation for ink viscosity variations.

10. A digital imaging system as recited in claim 7 wherein:
    the second printing parameters allow for compensation for manufacturing variations of a particular media type.

11. A process for capturing and printing images comprising the steps of:
    capturing image frames with a digital camera including an image sensor;
    storing the captured image frames in a volatile memory of the digital camera as raw image data;
    executing a first plurality of stored image processing algorithms in order to process the raw image data to produce processed image data, the first plurality of image processing algorithms including color filter array interpolation, tone scale compensation, color space transformation, and compression;

storing in a nonvolatile memory the first processed image data;

receiving from a printer directly connected to the digital camera fixed printer parameters and variable printer parameters from the digital printer; and storing the fixed printer parameters and variable printer parameters in a parameter memory in the digital camera; and executing a second plurality of image processing algorithms in order to produce the second processed image data, the second plurality of image processing algorithms including decompression, color space transformation into color planes that co-incide with process colors of the digital printer, and compensation for the printing process, the compensation being responsive to the fixed printer parameters and variable printer parameters stored in the parameter memory;

transferring the second processed image data from the digital camera to the printer; and producing a print using the second processed image data.

12. A process as set forth in claim 11 wherein the variable printer parameters compensate for printing process variations determined when the printer is manufactured.

13. A process as set forth in claim 12 wherein the variable printer parameters are measured using an external means.

14. A process as recited in claim 11 further comprising:
transmitting first printing parameters which can vary during printing from the printer to the digital camera and wherein the compensation is responsive to the first printing parameters which can vary during printing.

15. A process as recited in claim 5 further comprising:
transmitting second printing parameters which vary with particular media type used in the printer from the printer to the digital camera and wherein the compensation is responsive to the second printing parameters.

16. A process as recited in claim 15 wherein:
the first printing parameters allow for compensation for printing temperature variations.

17. A process as recited in claim 15 wherein:
the first printing parameters allow for compensation for ink viscosity variations.

18. A process as recited in claim 15 wherein:
the second printing parameters allow for compensation for manufacturing variations of a particular media type.

* * * * *